United States Patent
Stringham et al.

(10) Patent No.: US 11,382,394 B1
(45) Date of Patent: *Jul. 12, 2022

(54) WALKING STICK WITH INTEGRATED WATER FILTRATION

(71) Applicants: Kyle Cobb Stringham, Ogden, UT (US); Taylor Hill, Salt Lake City, UT (US); Margaret Goetzen, Salt Lake City, UT (US); Jonathan Hart, Salt Lake City, UT (US)

(72) Inventors: Kyle Cobb Stringham, Ogden, UT (US); Taylor Hill, Salt Lake City, UT (US); Margaret Goetzen, Salt Lake City, UT (US); Jonathan Hart, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,144

(22) Filed: Jul. 5, 2019

(51) Int. Cl.
*A45B 3/00* (2006.01)
*A45B 9/02* (2006.01)
(Continued)

(52) U.S. Cl.
CPC .................. *A45B 3/00* (2013.01); *A45B 9/02* (2013.01); *A45B 9/04* (2013.01); *C02F 1/002* (2013.01);
(Continued)

(58) Field of Classification Search
CPC .... A45B 3/00; A45B 9/02; A45B 9/04; A45B 2009/002; A45B 2009/007; A45B 2200/055; A61H 3/02; A61H 3/00; C02F 1/003; C02F 2307/02; C02F 1/002; A63C 11/221; A63C 11/222; A63C 11/22
(Continued)

(56) References Cited

U.S. PATENT DOCUMENTS

| 255,299 | A | * | 3/1882 | Keam | .................... A45B 3/00 135/66 |
| 3,038,483 | A | * | 6/1962 | Altsheler | ................ F41B 9/004 135/16 |

(Continued)

FOREIGN PATENT DOCUMENTS

CN 202558709 U * 11/2012

OTHER PUBLICATIONS

English translation of CN 202558709U from espacenet.com.*

*Primary Examiner* — David R Dunn
*Assistant Examiner* — Danielle Jackson
(74) *Attorney, Agent, or Firm* — Sandy Lipkin

(57) ABSTRACT

An embodiment includes a walking stick. The walking stick includes a rod assembly, a water purification assembly, and a manual pump. The rod assembly extends from a first end to a second end that is opposite the first end along a longitudinal direction of the rod assembly. The rod assembly includes at least one rod portion. The water purification assembly is integrated with the rod assembly. The manual pump is configured to impose a pressure gradient in the water purification assembly. The manual pump includes a plunger that is physically coupled to a handle portion. Motion of the plunger relative to the water purification assembly draws water into an inlet tube that is positioned in the rod portion and through the water purification assembly. The motion of the plunger results from translation of the handle portion in substantially the longitudinal direction of the rod assembly.

11 Claims, 16 Drawing Sheets

(51) Int. Cl.
*C02F 1/00* (2006.01)
*A45B 9/04* (2006.01)
*A45B 9/00* (2006.01)

(52) U.S. Cl.
CPC ... *A45B 2009/005* (2013.01); *A45B 2009/007* (2013.01); *A45B 2200/05* (2013.01)

(58) Field of Classification Search
USPC ............ 135/65–66, 72, 75.77; 280/809, 816, 280/819, 822; 215/308; 216/216
See application file for complete search history.

(56) References Cited

U.S. PATENT DOCUMENTS

| | | | | |
|---|---|---|---|---|
| 3,443,820 A | * | 5/1969 | Bryant | A63C 11/222 280/816 |
| 3,820,182 A | * | 6/1974 | Vockroth | A47L 13/00 15/1.7 |
| 4,229,015 A | * | 10/1980 | Ramsey | A63C 11/222 135/66 |
| 4,584,733 A | * | 4/1986 | Tietge | E04H 4/16 15/1.7 |
| 6,344,146 B1 | * | 2/2002 | Moorehead | C02F 1/002 210/136 |
| 8,318,011 B2 | * | 11/2012 | O'Brien | C02F 1/002 210/200 |
| 8,496,017 B2 | * | 7/2013 | Haddad | A45B 3/00 135/66 |
| 8,776,810 B2 | * | 7/2014 | Lah | A45B 9/00 135/75 |
| 10,881,173 B1 | * | 1/2021 | Stringham | A45B 3/00 |
| 2004/0216775 A1 | * | 11/2004 | Kotovsky | A45F 3/16 135/66 |
| 2005/0211284 A1 | * | 9/2005 | Dooley | A45B 3/00 135/65 |
| 2011/0132419 A1 | * | 6/2011 | Forrester | A45B 3/14 135/66 |
| 2011/0271580 A1 | * | 11/2011 | Carse | A01K 87/00 43/18.1 CT |

* cited by examiner

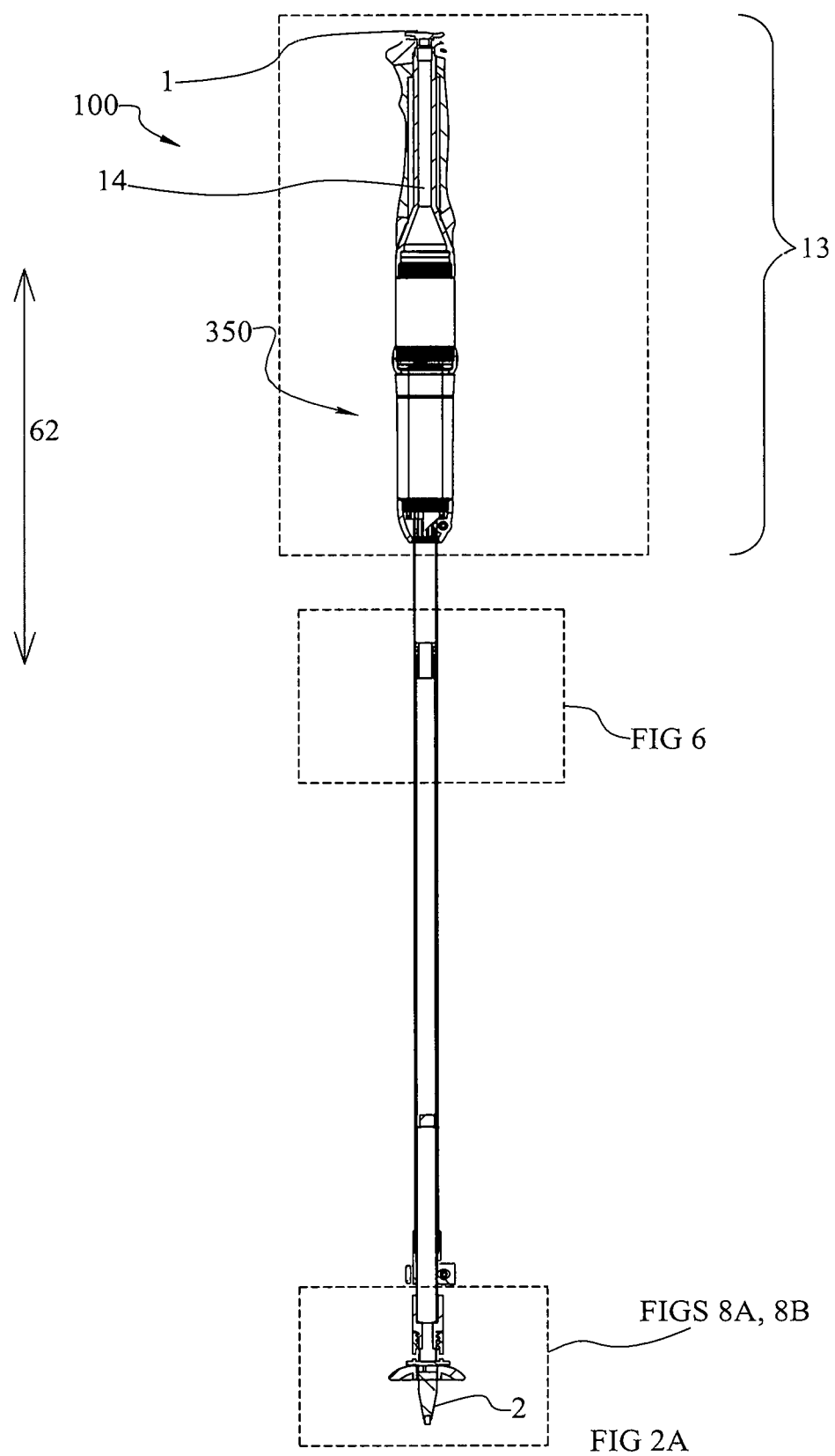

WALKING STICK WITH INTEGRATED WATER FILTRATION

REFERENCE TO PRIOR APPLICATION

This application claims priority of the provisional patent application 62/693,968, filed Jul. 4, 2018 entitled WALKING STICK WITH INTEGRATED WATER FILTRATION by Kyle Cobb Stringham.

BACKGROUND OF THE INVENTION

Field of the Invention

The field of this invention relates generally to the field of walking sticks and more specifically toward a walking with stick with integrated water filtration.

Description of the Prior Art

Obtaining drinkable or potable water when away from trustworthy public water sources can be problematic. For instance, while outdoors, such as during hiking trips, individuals may carry portable water obtained from a trustworthy source. Individuals may drink the water during a hike to maintain adequate levels of hydration. However, it is difficult to estimate an amount of water that is sufficient to maintain a healthy level of hydration. For instance, the temperature may be hotter than expected, which may increase consumption of the water. Moreover, water is heavy. Accordingly, carrying a water May introduce an additional load.

Additionally or alternatively, individuals may carry a portable water filtration system (filtration system). Filtration systems enable a user to draw water from a naturally occurring water source, such as a stream or lake, and to filter the water. However, filtration systems are an extra piece of equipment that is often forgotten and poorly-maintained. Moreover, through attempts to minimize the volume and weight of filtration systems, the functionality of some filtration systems has been reduced. For instance, use of some filtration systems involves the user laying on her stomach and putting her face near the water source. Additionally, filtration systems are stored while walking, which may introduce additional steps in obtaining potable water and may reduce the number of times users hydrate.

The subject matter cleaned herein is not limited to embodiments that solve any disadvantages or that operate only in environments such as those described above. Rather, this background is only provided to illustrate one example technology area where some embodiments described herein may be practiced.

SUMMARY OF THE INVENTION

The basic embodiment of the present invention teaches a walking stick, comprising: a rod assembly that extends from a first end to a second end that is opposite the first end along a longitudinal direction of the rod assembly, wherein the rod assembly includes at least one rod section; a water purification assembly that is integrated with the rod assembly, and a pump mechanism that is configured to impose a pressure gradient in the water purification assembly, wherein the pump mechanism includes a plunger that is physically coupled to a handle portion, motion of the plunger relative to the water purification assembly draws water into an inlet tube that is positioned in the rod section and through the water purification assembly, and the motion of the plunger results from translation of a handle portion in substantially the longitudinal direction of the rod assembly wherein the water purification assembly includes a filter inlet and a filter housing; and the filter housing define a filter volume configured to receive a filter device that is configured to remove at least a portion of contaminants from the water through imposition of the pressure gradient in the inlet tube and the filter volume.

The above embodiment can be further modified by defining that the length of said walking stick is adjustable by translating an additional rod section into said at least one rod section.

The above embodiment can be further modified by defining that at least one adjustment collar is situated between said at least one rod section and said additional rod section thereby securing said at least one rod section and said additional rod section relative to each other to either collapse or elongate said walking stick.

The above embodiment can be further modified by defining that said plunger is sealed to said rod assembly with a check valve.

The above embodiment can be further modified by defining that there is a seal between each of said at least one rod sections.

The above embodiment can be further modified by defining that said pump mechanism includes a lower volume and a filter chamber wherein said lower volume is selectively coupled to a volume defined in said rod sections.

The above embodiment can be further modified by defining that said lower volume is selectively isolated by a check valve.

The above embodiment can be further modified by defining that an additional check valve is positioned between said lower volume and said filter chamber.

The above embodiment can be further modified by defining that one or more inner rod seals are positioned within said rod assembly between said at least one rod portions and an additional rod portion.

The above embodiment can be further modified by defining that said inner rod seal has a head, a base and a channel defined through said head and said base.

The above embodiment can be further modified by defining that said head has recesses for receipt of a seal.

The above embodiment can be further modified by defining that a rod end is positioned at the end of said rod assembly wherein said rod end is configured to selectively enable entry of water into said rod assembly.

The above embodiment can be further modified by defining that said rod end has an outer sleeve with a plurality of openings that rotates relative to an inner sleeve with its own plurality of openings wherein when said plurality of openings on said outer sleeve are aligned with said plurality of openings on said inner sleeve are aligned, water is allowed entry into said rod assembly.

The above embodiment can be further modified by defining that there is a handle assembly with an upper handle and a lower handle wherein said upper handle and said lower handle are attached to a translating portion of said rod assembly via quick connect.

The above embodiment can be further modified by defining that there is an outlet for filtered water connected to the end of said walking stick and proximate a filter chamber.

The above embodiment can be further modified by defining that an accessory is attachable to said outlet.

The above embodiment can be further modified by defining that there is a lever positioned above said outlet.

BRIEF DESCRIPTION OF THE DRAWINGS

For a better understanding of the present invention, reference is to be made to the accompanying drawings. It is to be understood that the present invention is not limited to the precise arrangement shown in the drawings.

Figure 1:
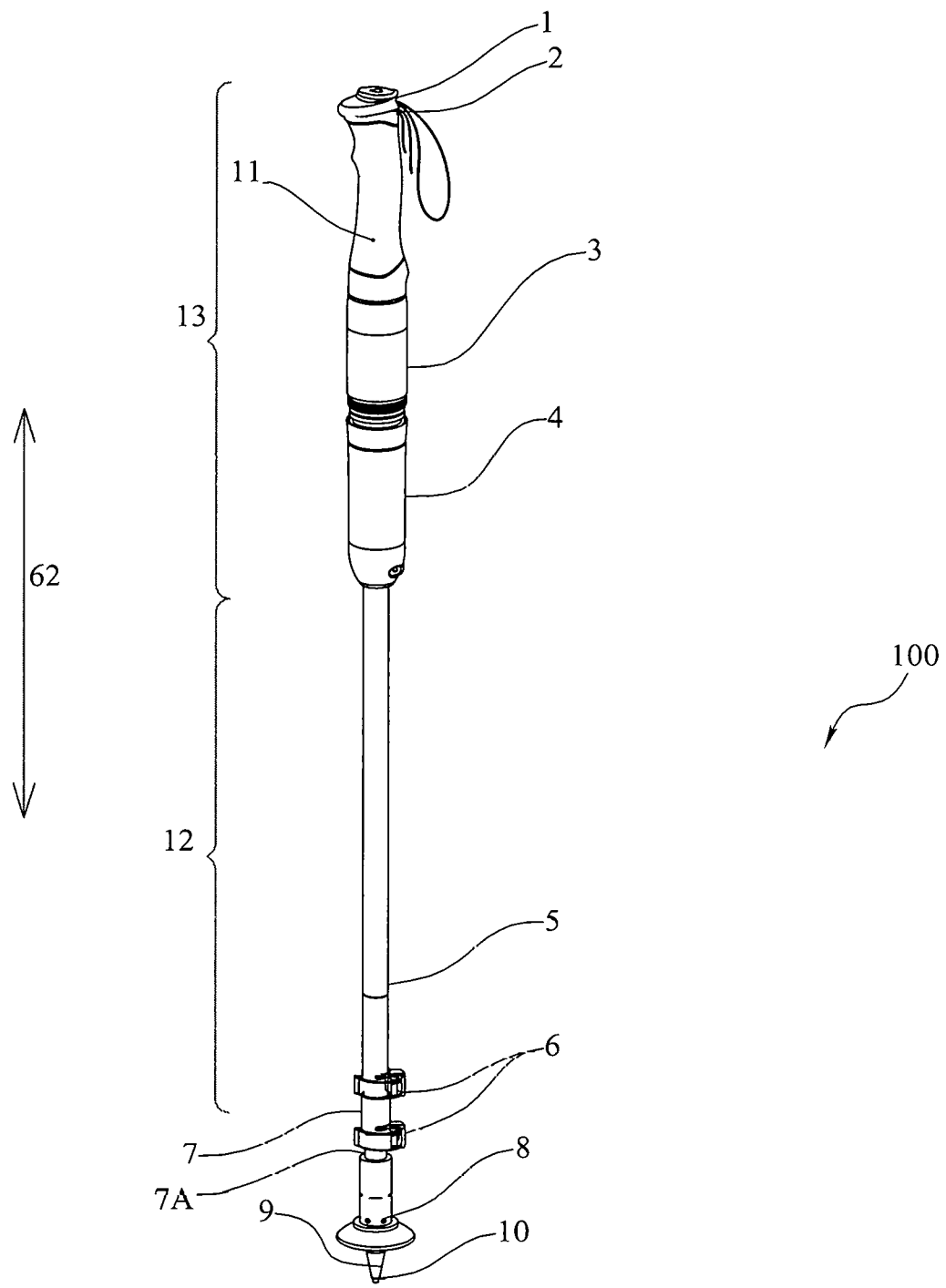
FIGS. 1-1A Illustrate views of an example walking stick with integrated water filtration (walking stick)

All arranged in accordance with at least one embodiment described herein.

DETAILED DESCRIPTION OF A PREFERRED EMBODIMENT

Turning to the drawings, the preferred embodiment is illustrated and described by reference characters that denote similar elements throughout the several views of the instant invention.

Figure 1A:
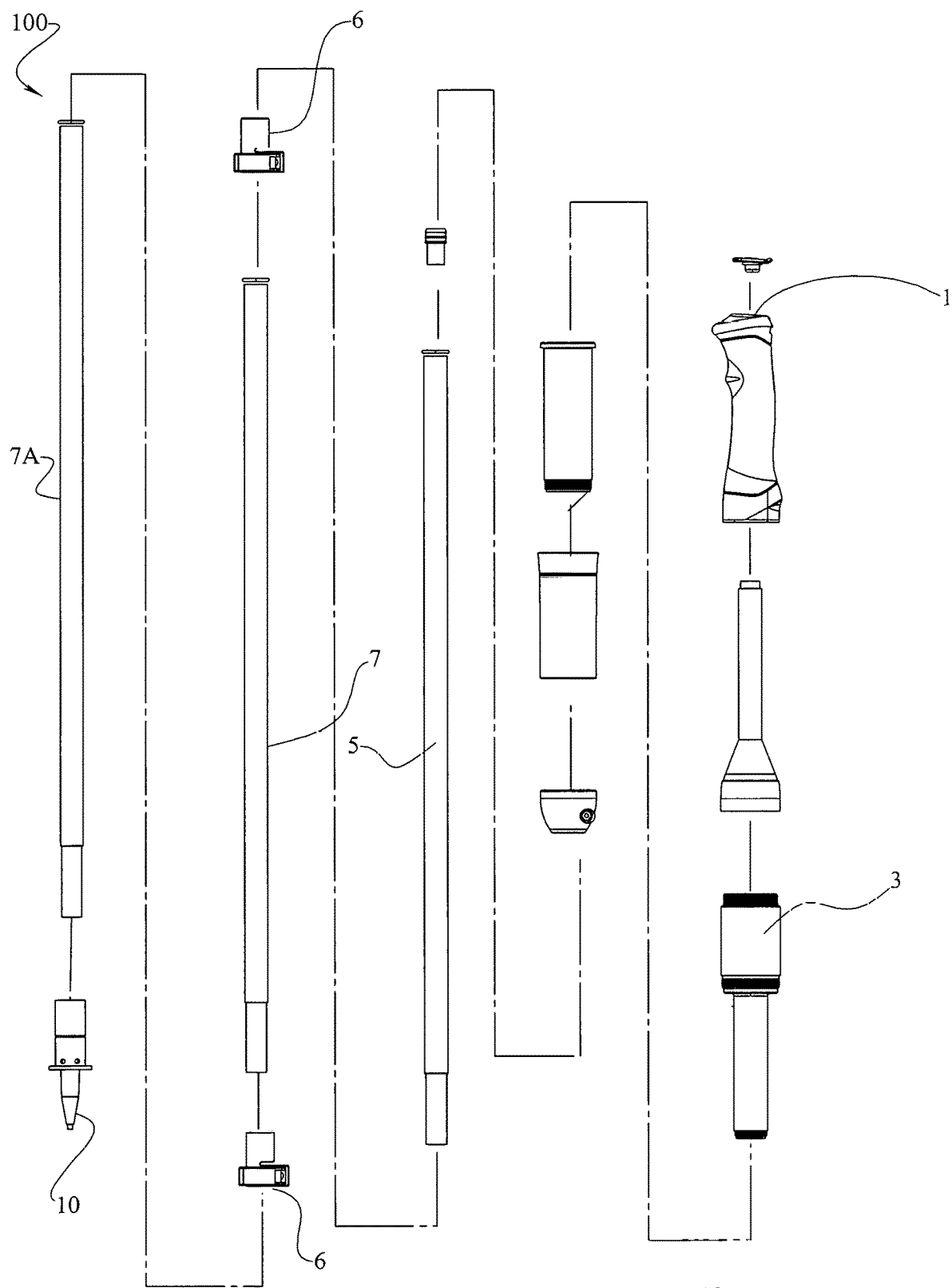

FIGS. 1-1A illustrate an example walking stick with integrated water filtration (hereinafter, "walking stick") 100.

The walking stick 100 may be used to support or aid in support of a user during activities such as walking, hiking, trekking, backpacking, camping, etc. For instance, the user may grip a portion of the walking stick such as a handle grip 11 that is located on a second end 2 of the walking stick 100 during the activity. Walking stick 100 may enable transfer of a portion of the weight of the user to the walking stick 100, which may assist and stability of the user and/or may reduce stress on the legs and/or the back of the user.

Additionally, the walking stick 100 enables a user to obtain potable drinkable water from a natural source such as a river or a stream and/or an untrustworthy source such as a fountain, a well, or a drinking fountain. For example, the user may place a portion of the walking stick 100 in the natural source or the untrustworthy source (collectively, "a source or sources"). The user may then operate a mechanism in the walking stick 100 to draw water from the source and force the water through a filter. As the water passes through the filter, contaminants or some portion thereof may be removed, which may make the water from the source suitable to drink or otherwise use (e.g., wash, cook, mix with other consumables, etc.)

The walking stick 100 may include a rod assembly 12 and a water purification assembly 13. The water purification assembly 13 is integrated with and/or into the rod assembly 12. For instance, the general external structure of the rod assembly 12 incorporates the general external structure of the water purification assembly 13 to make a substantially cylindrical structure. The overall external structure and appearance of the walking stick 100 includes a series or set of substantially cylindrical portions with similar diameters. In some embodiments, the outer diameter of the water purification assembly 13 or portion thereof may be substantially similar to or the same as at least one of the outer diameters of the rod assembly 12.

Integration of the water purification assembly 13 with or into the rod assembly 12 may result in an improvement in the function of the walking stick 100 compared to walking sticks in which a water purification assembly is offset from the rod assembly 12. For instance, during used and between instances of obtaining water from the source, the user may use the walking stick 100 similar to how the user would use a walking stick without the water purification assembly 13. Additionally, the integration reduces an overall external profile of the walking stick 100 and may conceal the water purification assembly 13. Additionally still, a transition from use of the walking stick 100 as a walking stick (e.g., for support) to use as a water filter is minimized. For example, the user does not have to significantly reconfigure the walking stick 100 use as a water filter.

The rod assembly 12 extends between opposite ends 2, 9 of the walking stick 100. Between the opposite ends 2, 9, a length of the walking stick may be defined. The length is defined along the longitudinal direction 62. The length may depend on a particular application or activity for which the walking stick is designed. For example, the walking stick 100 may be designed for children, adults, taller people, strenuous hiking, walking, etc. The lengths may be different for each of these. For instance, for children the length may be short (e.g., between about 24 inches and about 40 inches). Alternatively, the walking stick 100 may be designed for adults. In these embodiments, the length may be between about 48 inches and about 59 inches in some embodiments.

In the embodiment of FIGS. 1-1A, the length may be adjustable. In these and other embodiments, the walking stick 100 may include one or more components or features that enable the length to be adjusted. For example, the rod assembly 12 may include one or more rod sections. The rod sections may be selectively secured relative to one another. For instance, a first rod section may include a smaller diameter than a second rod section 7. The first rod section 5 may accordingly be able to be translated into and within the second rod section 7 and to be selectively retained within a second rod section 7.

The rod assembly 12 may also include one or more adjustment collars 6 between rod sections. The adjustment collar 6 is configured to secure at least one of the rod sections relative to at least one other of the rod sections 7. 7A. The adjustment collar 6 may be loosened and tightened. For example, the adjustment collars 6 may include a lever that may be rotated relative to the rod sections in a first direction to loosen the adjustment collars 6 and in a second direction to tighten the adjustment collars 6. Loosening the adjustment collar 6 enables translation of one of the rod sections relative to at least one other of the rod sections 7, 7A. Additionally, tightening of the adjustment collar 6 may secure the at least one of the rod sections relative to at least one other of the rod sections 7, 7A. Accordingly, using the adjustment collar 6, the rod assembly 12 may be configurable in a collapsed arrangement and an elongated arrangement. In the collapsed arrangement, the rod sections are translated relative to one another such that the length of the rod assembly 12 is a shortest length. In the elongated arrangement, the rod sections are translated relative to one another such that the length of the rod assembly 12 is a greatest length.

The walking stick 100 defines one or more openings 8 at a first end 9 of the rod assembly 12. In the depicted embodiment, the openings are defined in a rod tip 10 near the first end 9. In other embodiments, the openings 8 may be positioned at the first end 9. For instance, instead of a point or integrated into the point, the opening(s) 8 may be defined. The openings 8 may enable water to enter the walking stick 100 from the source.

The rod assembly 12 may define a volume that is fluidly coupled to the water purification assembly 13. The rod assembly 12 may be lined or may be comprised of a food grade plastic or another suitable material. The rod assembly 12 is configured to enable transport of the water from the opening 8 to the water purification assembly 13. Accordingly, the walking stick 100 includes an inlet volume that is defined from the opening 8 to the water purification assembly 13. The inlet volume fluidly couples the opening 8 to the water purification assembly 13.

To draw the water into the walking stick 100, the first end 9 may be placed in a source such that the opening 8 located on the first end 9 is submerged in the water source. Pressure gradient may be imposed in the water purification assembly 13 and the inlet volume. The pressure gradient may act to draw the water from the source into the inlet volume and to the water purification assembly 13. The water purification assembly 13 is configured to filter water. One or more structural features of the walking stick 100 assist in the delivery of the water to the water purification assembly 13. In addition, one or more structural features of the walking stick 100 enable access to filtered water as it exits the water purification assembly 13.

The water purification assembly 13 includes a filter housing 3 that defines a filter chamber into which a filter device (not shown) may be positioned. A filter inlet may be defined at a lower end (e.g., having a lower y-coordinate) of the filter housing 3. The water may enter the water purification assembly 13 through the filter inlet. The water passes through a filter device in the filter volume because a pressure gradient is imposed in the water purification assembly 13. As the water passes through the filter device, at least a portion of contaminants are removed from the water.

The walking stick 100 includes an outlet 1. The outlet 1 includes an exposed end that is externally accessible. For example, a user may access filtered water from the outlet 1. The outlet 1 is fluidly coupled to the filter chamber 14. For example, filtered water exits the walking stick 100 by the outlet 1 after it has passed through a filter device positioned in the filter chamber 14.

The pressure gradient imposed in the water purification assembly forces the water drawn from the source through the filter device positioned in the filter chamber 14. After the water passes through the filter device, it is considered filtered water. The filtered water is then pushed out of the walking stick 100 via the outlet 1. The user may collect the filtered water at the outlet 1.

The pressure gradient imposed in the inlet volume may be caused by a pump mechanism. In the depicted embodiment, the pump mechanism includes a manual pump. Some additional details of the pump mechanism are described elsewhere in the present disclosure. In some embodiments, the pump may include an electrical pump. The electrical pump may be positioned within the handle portion 11 of a walking stick 100 or another portion of the walking stick 100. The electrical pump may impose a pressure gradient in the water purification assembly 13. The pressure gradient may draw water from the source, through the inlet volume, through the filter device, and out the outlet 1.

The filter device is removable. Some examples of the filter device include a hollow fiber, a carbon filter, a charcoal filter, a silica depth, a ceramic filter, a fiberglass filter, or another suitable media. In some embodiments, the filter device includes a pore size of less than 0.4 microns (e.g., 0.2 or 0.1 microns). The water purification assembly 13 may include various sizes and/or capacity. For example, the water purification assembly 13 may be configured to filter large volumes (e.g., multiple gallons) of water, which may provide potable water for multiple people. Alternatively, the water purification assembly 13 may be configured to filter a personal amount of water (e.g., about a gallon).

The rod assembly 12 or components thereof may be comprised of aluminum, copper, steel, plastic, carbon fiber, wood, or any other suitable material. The rod assembly 12 is substantially straight. For example, between the opposite ends 2, 9, there are no angles or bends. In some embodiments, the rod assembly 12 includes at least one angle or at least one bend. For example, the handle grip 11 may curve such that a portion thereof is parallel or substantially parallel to the x-axis. Additionally, some embodiments of the walking stick 100 may include multiple bends and angles, which may help with ergonomics and functionality.

The embodiment of FIGS. 1-1A illustrates the walking stick 100 with the water purification assembly 13. In some embodiments, the walking stick 100 may be manufactured without various components such as the pump mechanism, the water purification assembly 13, the inlet tube, etc. The walking stick 100 without the components may be paired with the walking stick 100 with the water purification assembly 13. A user may then have a set of walking sticks, one for each hand. In the walking stick 100 without the components, volumes previously used for components may be storage volumes.

Figure 2:
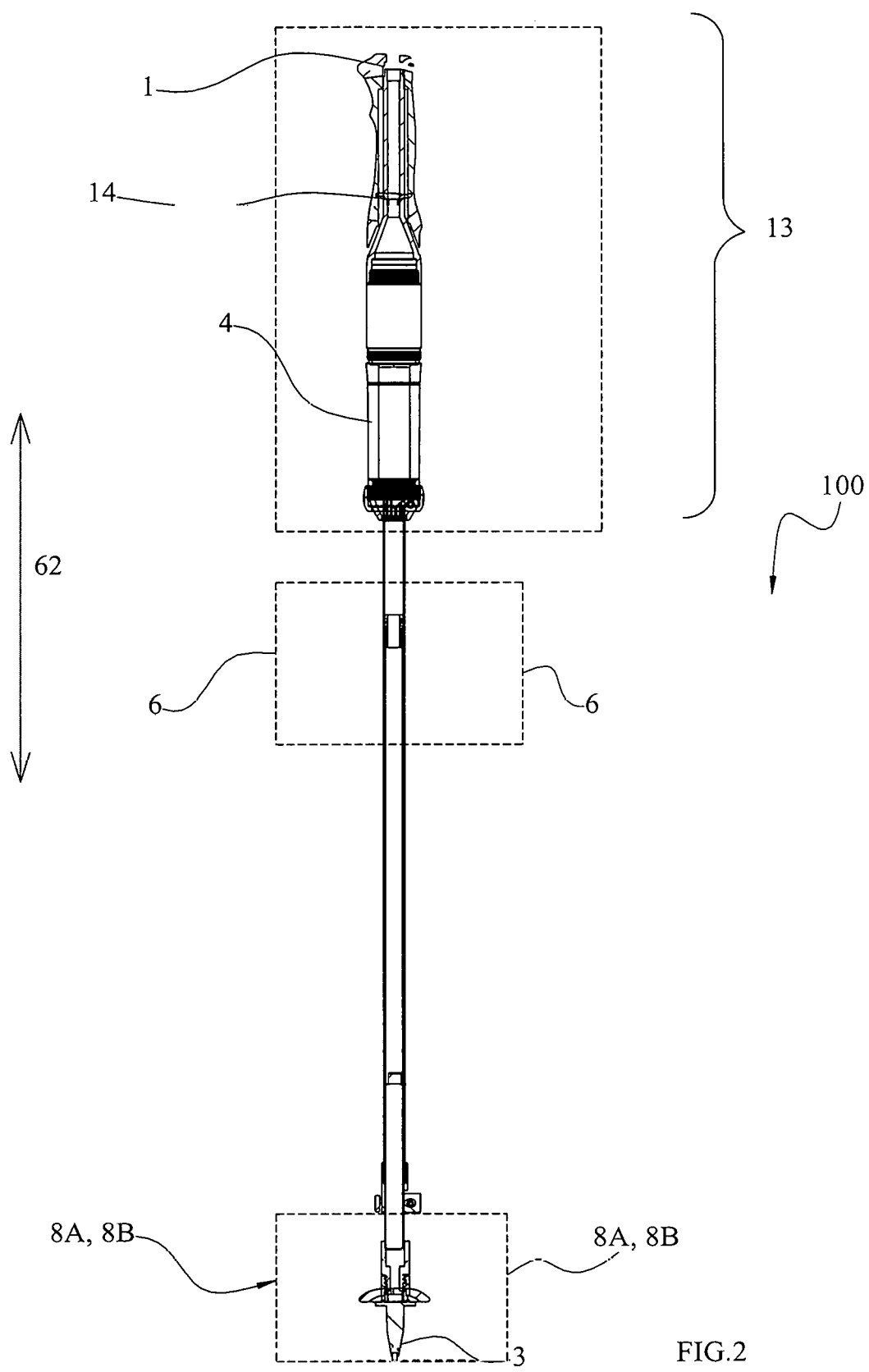
FIGS. 2-2D illustrate sectional views of the walking stick of FIGS. 1-1A or portions thereof.
Figure 2B:
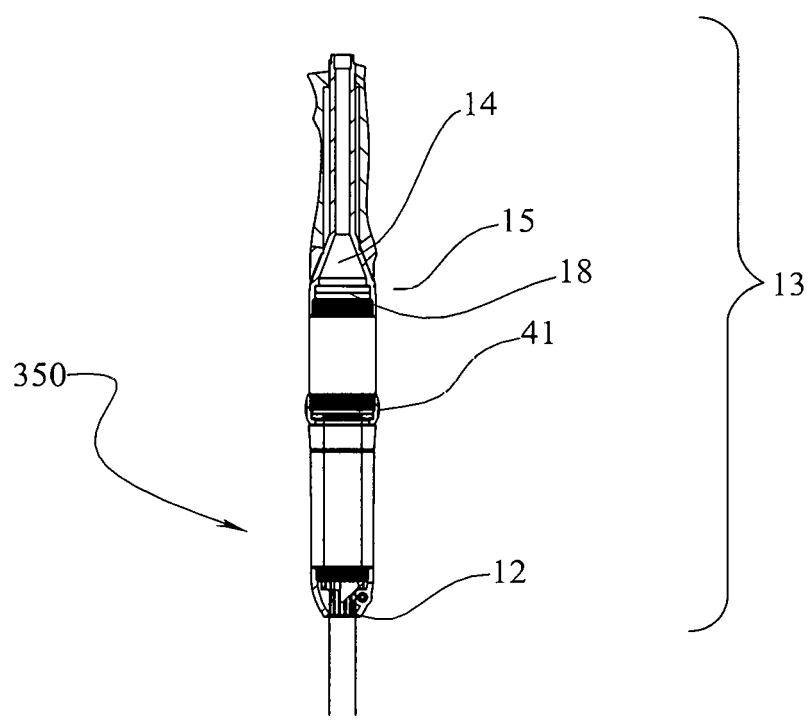
Figure 2C:
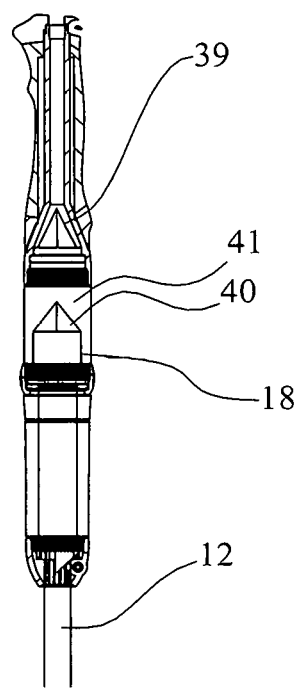
Figure 2D:
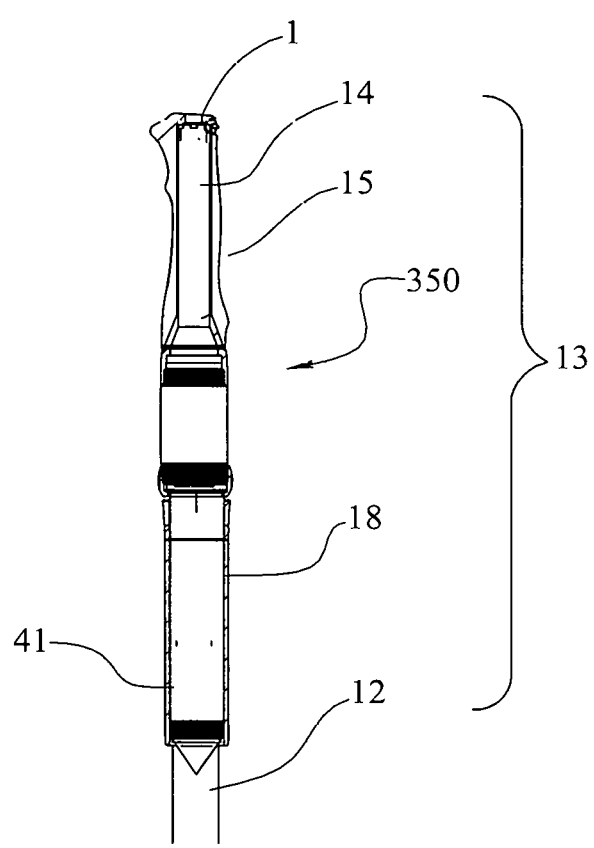

FIGS. 2-2D illustrates sectional views of the walking stick 100 of FIGS. 1-1A or portions thereof. FIG. 2A is a side sectional view of the walking stick 100. FIG. 2B illustrates a sectional view of a middle portion of the walking stick. FIG. 2C illustrates the sectional view of a valve assembly of the walking stick 100. FIG. 2D illustrates a sectional view of a translating portion of the walking stick 100.

With reference to FIG. 2, the walking stick 100 is substantially hollow. For instance, the rod sections define a volume that is fluidly coupled to the first end 9 of the walking stick 100. Unfiltered water may be drawn up from a water source into the volume using a pump mechanism and delivered to a filter subassembly. The pump mechanism is a manual pump mechanism that a user of the walking stick may operate. The volume may be defined in each of the rod sections. The rod sections may be extendable and may seal to one another whether or not the rod sections are extended relative to one another.

To draw the water through the water purification assembly 13 a pressure gradient is imposed on the water purification assembly 13 and the volume defined in the rod assembly 12. The pressure gradient may be imposed by the pump mechanism, which may be a manual pump. As used in the present disclosure, the term manual indicates that the user provides a motive force that actuates the mechanism or mechanisms of a device. For instance, in the pump mechanism, the user actuates the pump mechanism by moving the translating portion 15 in substantially the longitudinal direction 62.

The pump mechanism may further press water through a filter chamber 14 and out the outlet 1. For example, a filter may be positioned in the filter chamber 14. The pump mechanism may impose a pressure gradient across the filter. Due to the pressure gradient, the unfiltered water may be filtered prior to being released by the outlet 1.

With reference to FIGS. 2-2D, the walking stick 100 may include a translating portion 15 at a top portion of the filter chamber 14. The filter is housed inside a handle 11. The handle 11 may define the filter chamber 14, which may be coupled to a plunger 18. The plunger 18 may extend into a lower volume 41 and may translate as the user translates the handle 11 relative to remaining portions of the walking stick 100.

A handle 11 and the translating portion 15 may be selectively coupled to a top of a rod section. To use the pump mechanism, the translating portion 15 may be released from the rod section and the translating portion 15 may be translated relative to the rod section to operate the pump mechanism.

With reference to FIGS. 2C and 2D, a bottom of a plunger 18 may be sealed to the inner surface of the lower volume. In addition, the bottom of a plunger 18 may be fit with a one-way check valve such as a duckbill valve, umbrella valve or another suitable check valve. A valve may enable unfiltered water to pass from the lower volume 41 to the filter chamber 14 and may prevent water from passing from the filter chamber 14 to the lower volume 41.

With reference to FIGS. 2B and 2C, the rod assembly 12 is selectively attached to the translating portion 15. The upper part of the rod assembly 12 may define the lower volume 41. Additionally, the upper portion of the rod assembly 12 may be coupled to one of the rod sections. The walking stick 100 may include one or more seals that make the coupling between the rod sections and the pump mechanism watertight. For instance, one or more O-rings and one or more O-ring housings may be implemented in to seal the rod section to the pump mechanism and upper parts of the rod assembly 12.

Figure 3A:
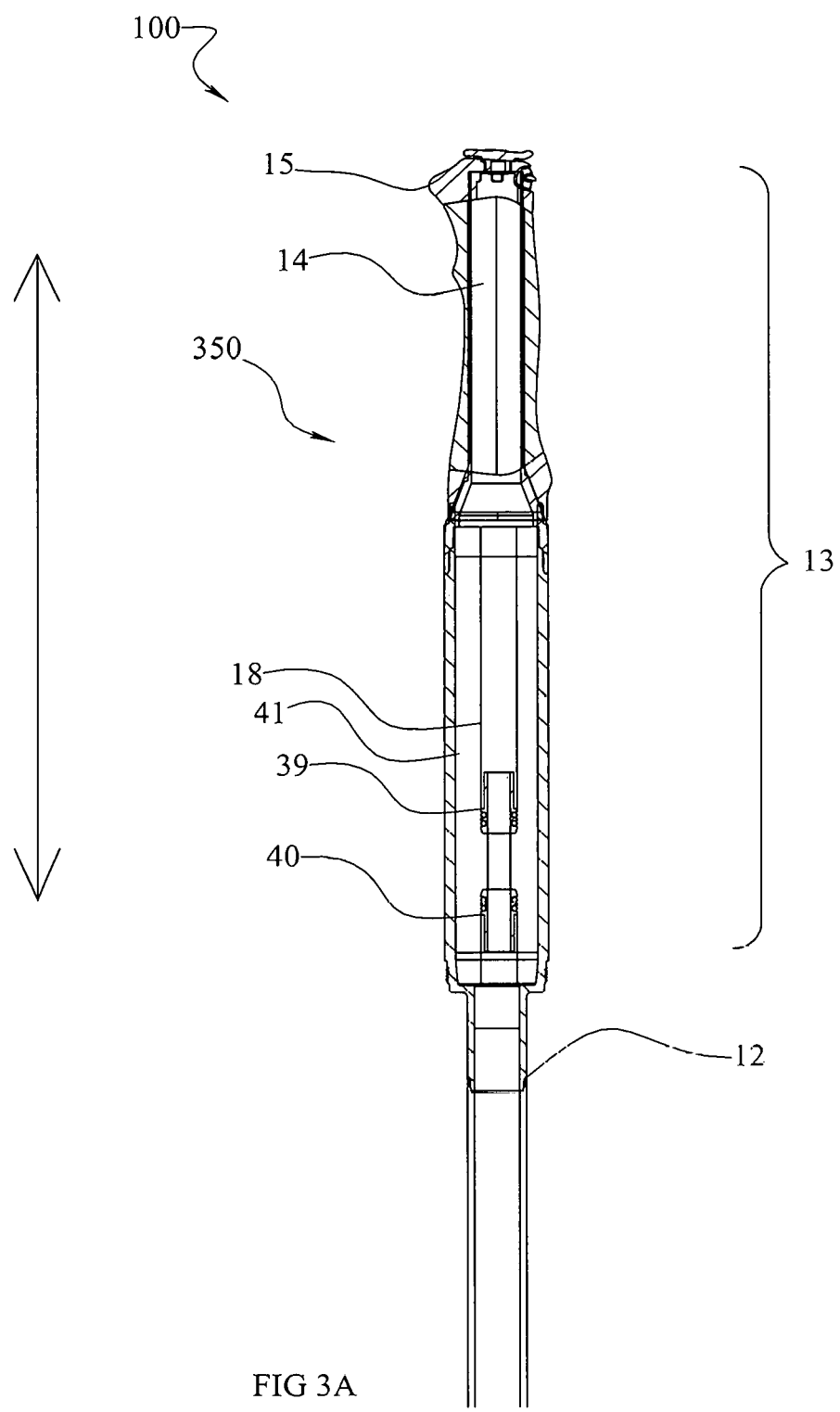
FIGS. 3A-3C illustrate an example pumping operation implemented in the walking stick of FIGS. 1-1A.
Figure 3B:
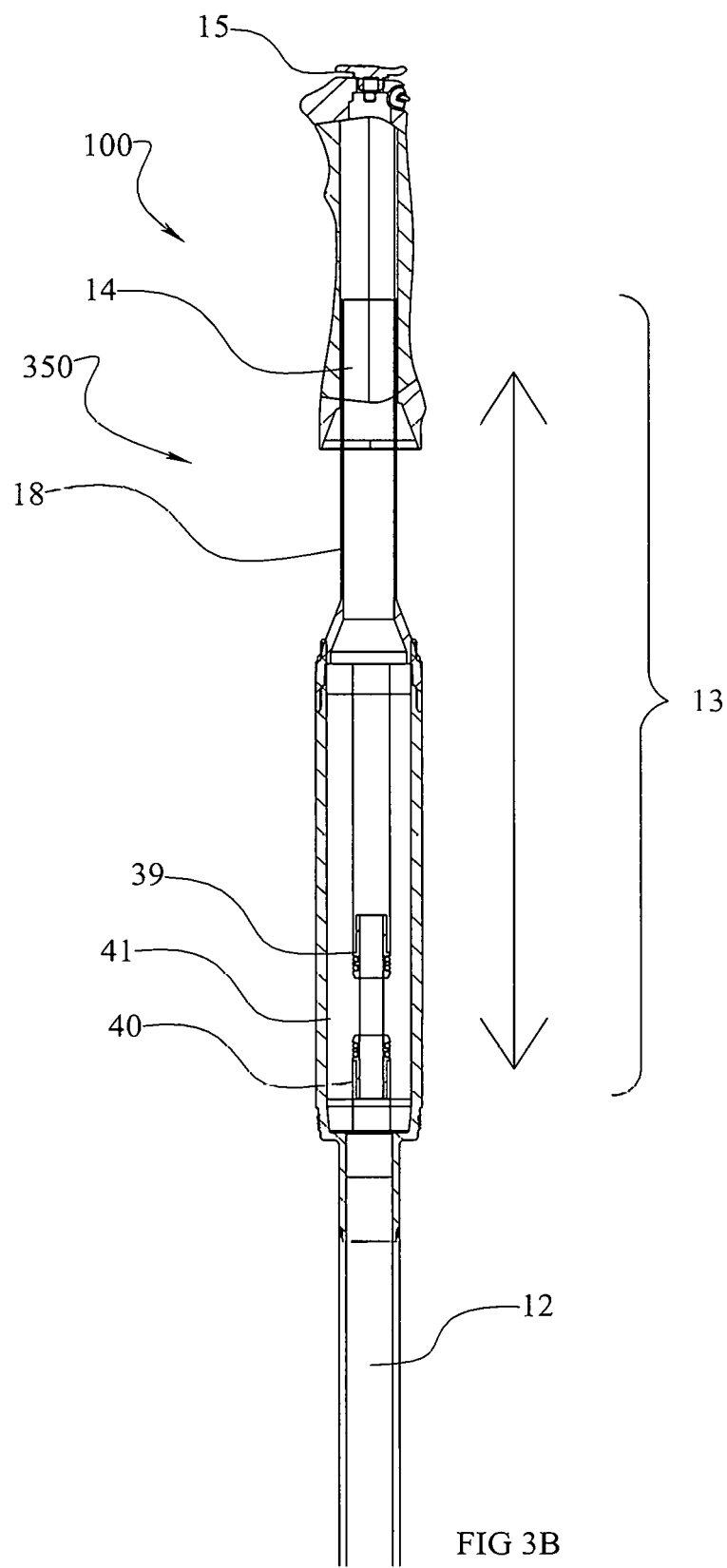
Figure 3C:
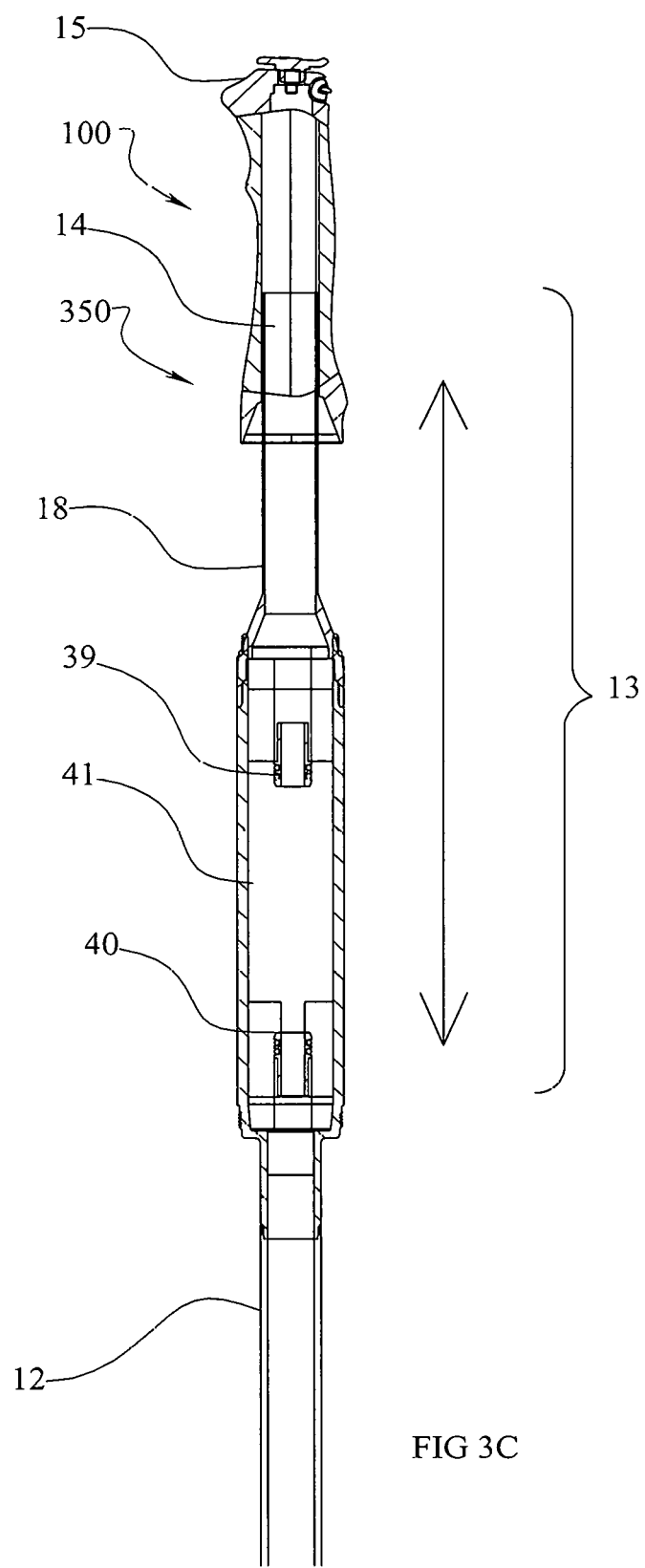

FIGS. 3A-3C illustrates an example pumping operation that may be implemented in the walking stick 100 of FIGS. 1-1A. FIGS. 3A-3C are sectional views of a pump mechanism 350. FIG. 3A depicts the pump mechanism 350 in a first position. FIG. 3B depicts the pump mechanism 350 in a second position. FIG. 3C depicts the pump mechanism 350 in a third position. The pumping operation generally proceeds from the first position, to the second position, to the third position, back to the second position, to the first position, and repeated, if desired.

The pump mechanism 350 includes a two-volume, inline pump mechanism. The volumes of the pump mechanism 350 may be selectively fluidly coupled. For example, the pump mechanism 350 may include a lower volume 41 and a filter chamber 14. The lower volume 41 may be selectively coupled to a volume defined in the rod sections of the rod assembly 12. The lower volume 41 may be selectively isolated by a one-way check valve such as a duckbill or umbrella valve defined hereinafter referred to as the lower valve 40. The lower valve 40 may enable water to be routed from the volume defined by the rod assembly 12 to the lower volume 41. The lower valve 40 may prevent or substantially prevent water from transferring from the lower volume 41 to the volume defined by the rod assembly 12.

The pump mechanism 350 may also include another check valve 39 hereinafter referred to as the upper valve positioned between the lower volume 41 and the filter chamber 14. For instance, a plunger 18 may include an upper valve 39 at a bottom portion of the plunger 18. The upper valve 39 may enable water to enter the plunger 18 and the filter chamber 14 from the lower volume 41. The upper valve 39 may substantially prevent water from transferring from the filter chamber 14 to the lower volume 41.

The plunger 18 may seal against an inner surface of the lower volume 41. Accordingly, as the pump mechanism 350 transitions between the first position, to the second position, and to the third position, the pump mechanism 350 and in particular the plunger 18 may be configured to draw unfiltered water up the rod assembly 12 to the lower volume 41. The unfiltered water may move through the lower valve 40 as the pump mechanism 350 transitions from the first position, to the second position, and to the third position.

As the pump mechanism 350 transitions between the third position, to the second position, and to the first position, the unfiltered water in the lower volume 41 may be pressed through the upper valve 39 and into the filter chamber 14. A filter may be positioned in the filter chamber 14 and may filter the unfiltered water under the pressure induced due to the transition between the third position to the first position. To draw additional unfiltered water into the lower chamber, the pump mechanism 350 may be transitioned from the first position to the third position. The unfiltered water may be pushed through the filter chamber 14 by transitioning the pump mechanism 350 from the third position to the first position. The filtered water may exit the translating portion 15 via the outlet 1.

The filter chamber 14 may be positioned in the translating portion 15 of the handle 11. The lower volume 41 may be included just below the translating portion 15 on the rod assembly 12 of the walking stick 100.

Figure 5:
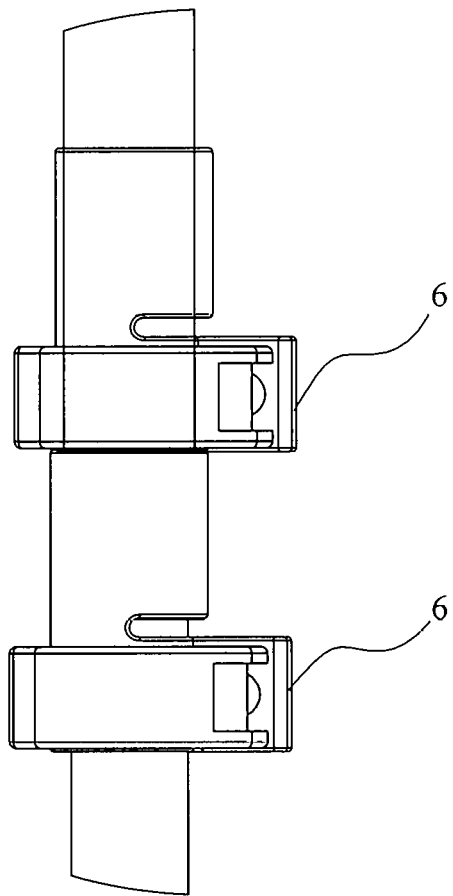
FIG. 5 illustrates example adjustment collars that may be implemented in the walking stick of FIG. 1.

FIG. 5 illustrates example adjustment collars 6 that may be implemented in the walking stick 100 of FIGS. 1-1A. The collars 6 may be implemented on the rod assembly 12 of the walking stick 100. Collars 6 may enable rod sections to be extended or translated relative to one another. For instance, the rod assembly 12 of the walking stick 100 includes three rod sections 5, 7, 7A. Accordingly, there may be two collars 6 that control relative positioning between the rod sections 5, 7, 7A.

Figure 4C:
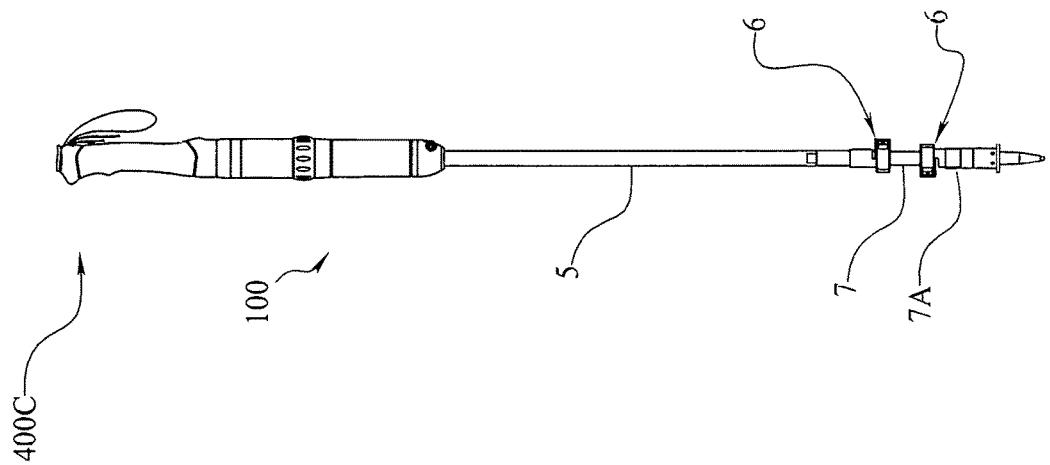
FIGS. 4A-4C illustrate the walking stick of FIG. 1 configured at multiple lengths.
Figure 4B:
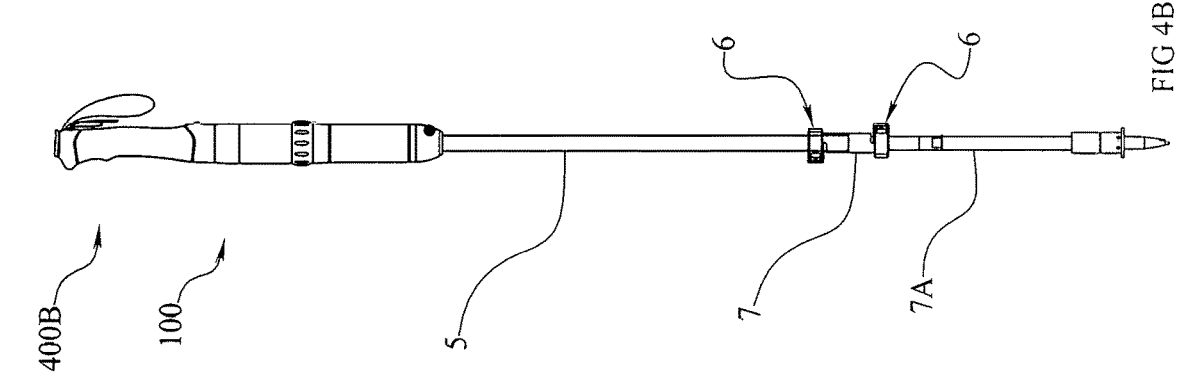
Figure 4A:
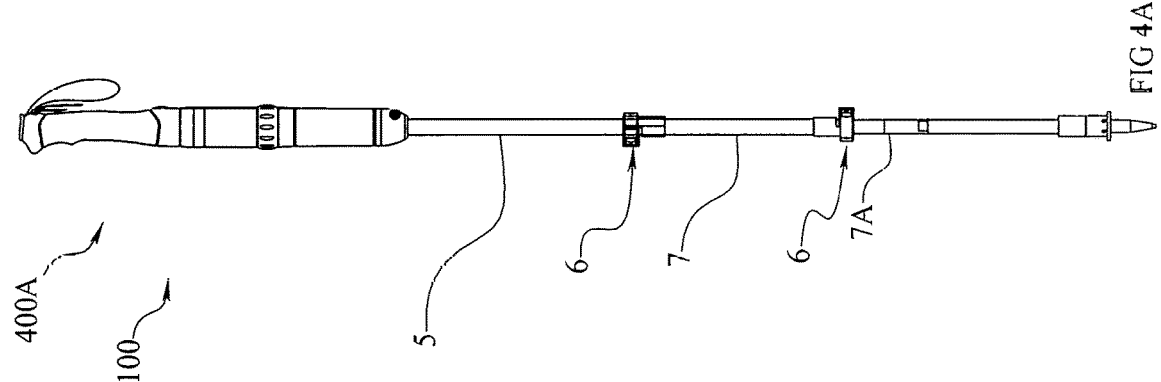

FIGS. 4A-4C illustrate the walking stick 100 of FIGS. 1-1A configured at multiple lengths 400A, 400B, and 400C. The walking stick may include a first rod section 5, a second rod section 7, and a third rod section 7A (collectively, sections). The collars 6 may selectively retain the sections or some subset thereof relative to one another. For instance, FIG. 4A includes the walking stick 100 arranged at a first length 400A. FIG. 4B includes the walking stick 100 arranged at a second length 400B, and FIG. 4C includes the walking stick 100 arranged at a third length 400C.

To arrange the walking stick 100 in the first length 400A, the collars 6 may be arranged to enable translation of the sections relative to one another. For instance, a first collar 6 may be unlocked and a second collar 6 may be unlocked. The second rod section 7 may be withdrawn and translated relative to the first rod section 5. Additionally, the third rod section 7A may be withdrawn and translated relative to the second rod section 7. After the walking stick 100 is arranged at the first length 400A, the collars 6 may be locked. After it is locked, the walking stick 100 may be used at the first length 400A.

To arrange the walking stick 100 in the second length 400B after it is arranged in the first length 400A, the first collar 6 may be unlocked and the second collar 6 may be locked. The second rod section 7 may be introduced into the first rod section 5. The third rod section 7A may be maintained withdrawn from the second rod section 7 and/or the first rod section 5. After the walking stick 100 is arranged at the second length 400B, the first collar 6 may be locked. After it is locked, the walking stick 100 may be used at the second length 400B.

To arrange the walking stick 100 in the third length 400C after it is arranged in the second length 400B, the second collar 6 may be unlocked and the first collar 6 may be locked. The third rod section 7A may be introduced into the second rod section 7. The third rod section 7A may be maintained in the second rod section 7. After the walking stick 100 is arranged at the third length 400C, the second collar 6 may be locked. After it is locked, the walking stick 100 may be used at the third length 400C.

Figure 6:
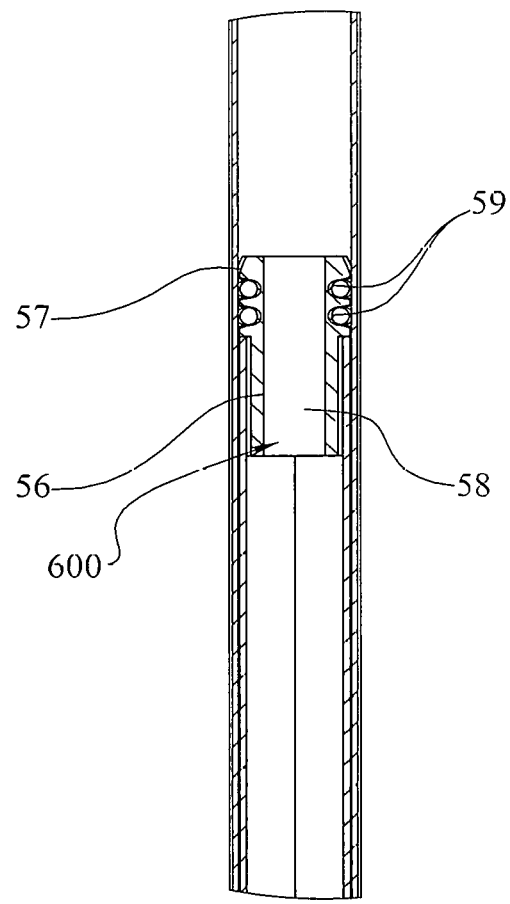
FIG. 6 illustrates an example inner-rod seal that may be implemented in the walking stick of FIG. 1 taken along line 6-6 in FIG. 2.

FIG. 6 illustrates an example inner rod seal 600 that may be implemented in the walking stick 100 of FIGS. 1-1A. The inner rod seal 600 may be positioned within the rod assembly 12 of the walking stick 100 between rod sections. For instance, the inner rod seal 600 is positioned between the first rod section 5, which is the outer rod section, and the second rod section 7, which is the inner rod section. The outer rod section 5 may be configured to translate relative to the inner rod section.

The inner rod seal 600 may include a head 57, a base 56, and a channel 58 defined through the head 57 and base 56. The head 57 may be placed against an end of the second rod section 54. The head 57 may include a diameter that corresponds to an inner volume of the first rod section 53. The head 57 includes recesses 59 configured for receipt of O-rings or other suitable rings that seal the head 57 relative to the first rod section 53. The base 56 may extend into an inner volume of the second rod section 54. The second rod section 54 with the inner rod seal 600 may translate relative to the first rod section 53. As the second rod section 54 translates, the inner rod seal 600 maintains a seal against the inner surface of the first rod section 53.

The walking stick 100 may include multiple inner rod seals 600. For instance, the walking stick 100 may include one of the inner rod seals 600 at each junction between each of the rod sections.

Figure 7C:
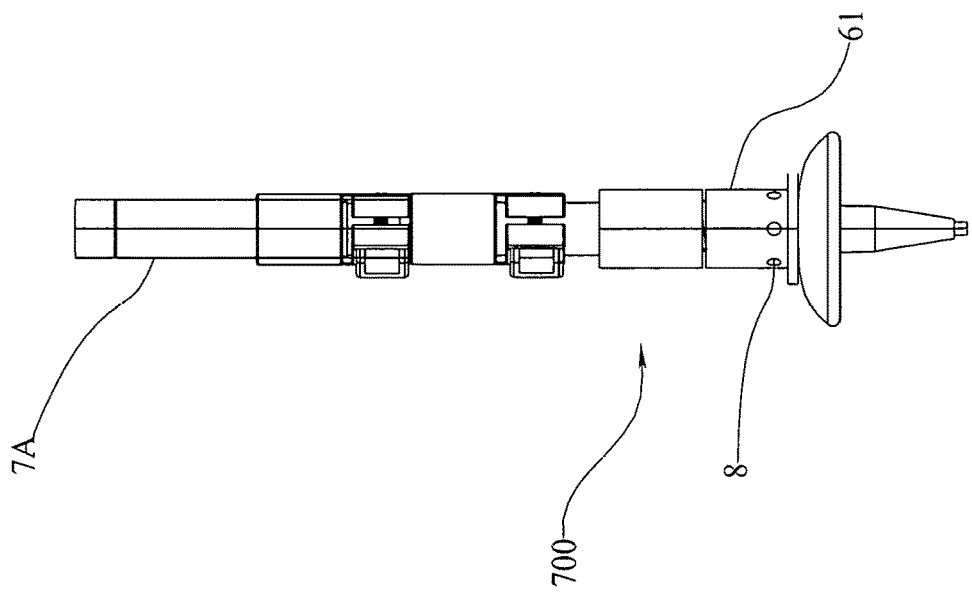
FIGS. 7A-7C illustrate an example rod end that may be implemented in the walking stick of FIG. 1.
Figure 7B:
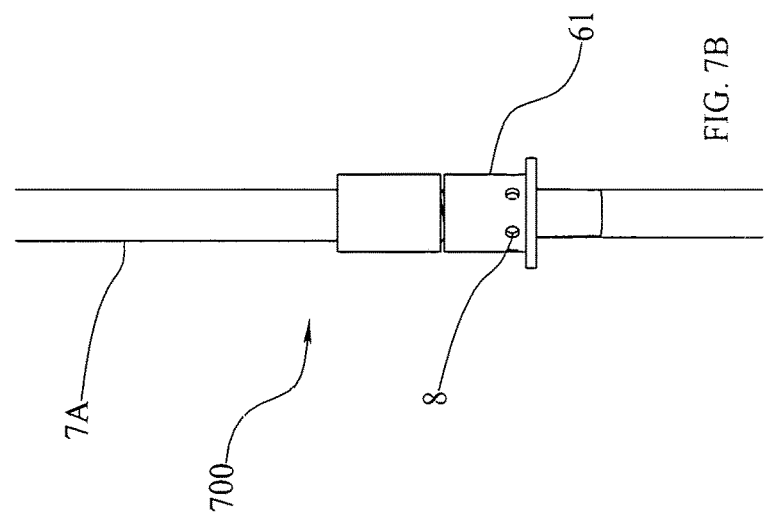
Figure 7A:
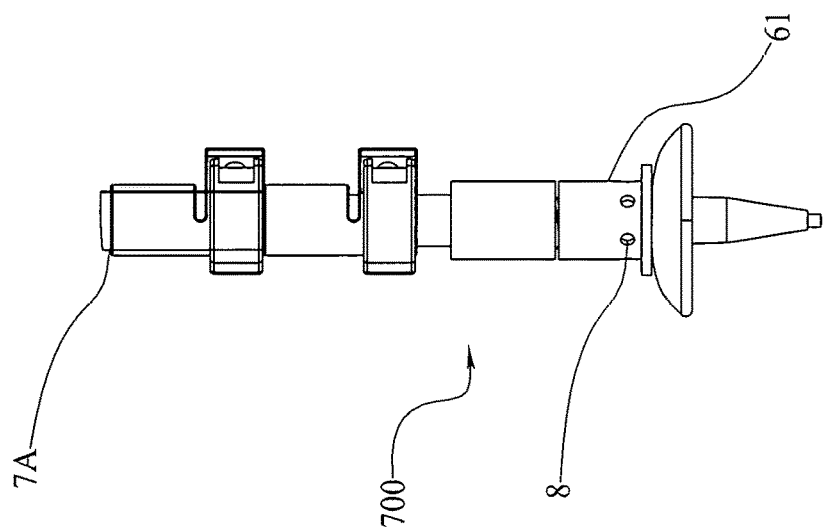
Figure 8B:
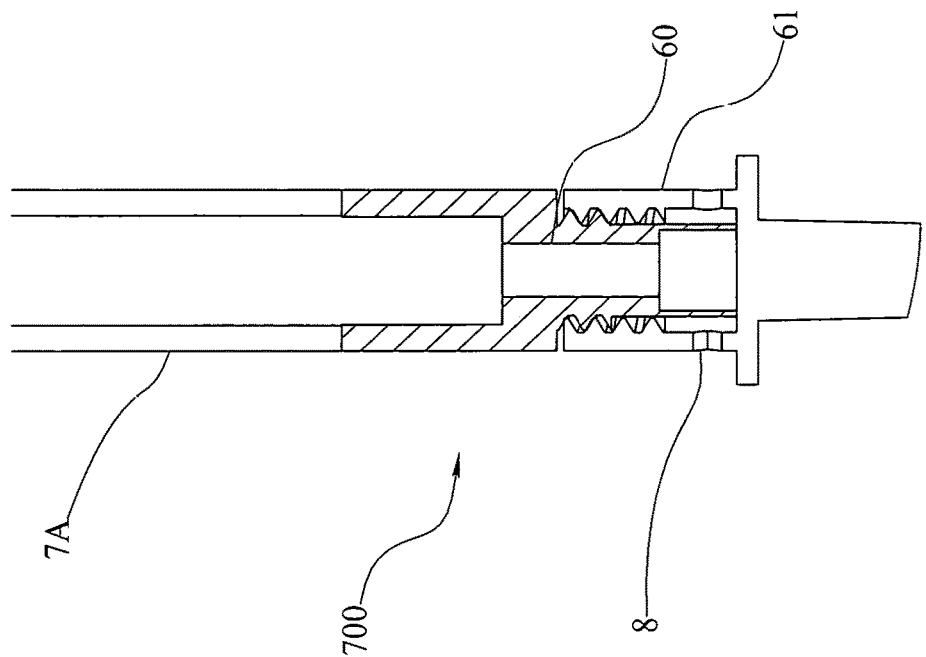
FIGS. 8A-8B illustrate sectional views of the rod end of FIGS. 7A-7C and taken along line 8A, 8B—8A, 8B in FIG. 2.
Figure 8A:
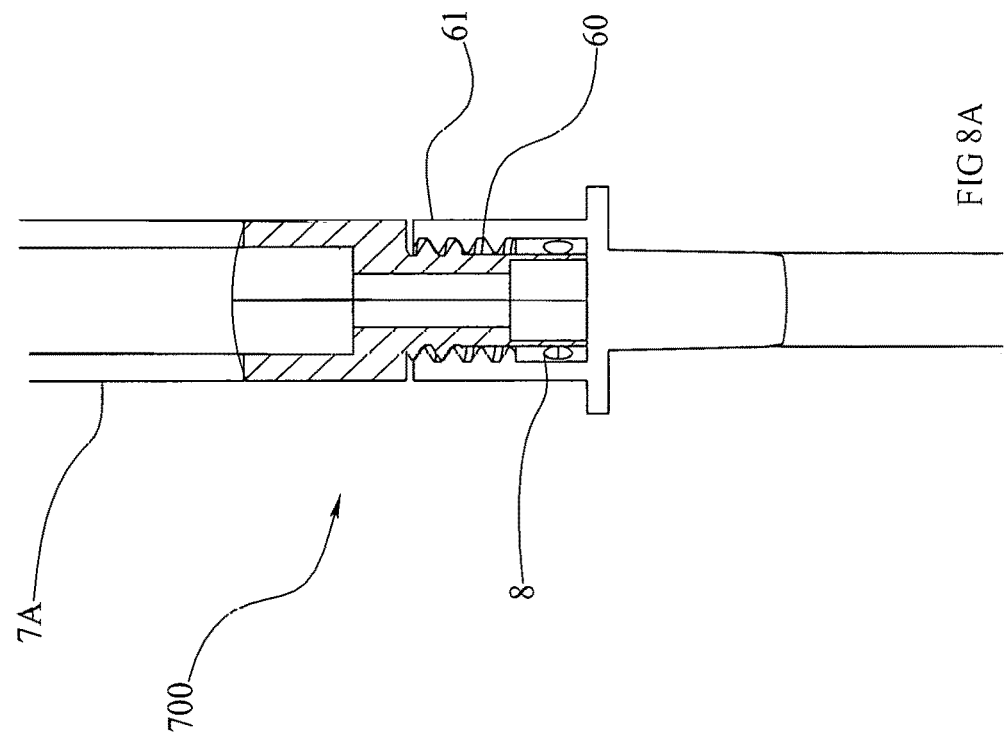

FIGS. 7A-7C illustrate an example rod end 700 that may be implemented in the walking stick of FIGS. 1-1A. FIGS. 8A and 8B illustrate sectional views of the rod end 700 of FIGS. 7A-7C. FIG. 7A is a side view of the rod end 700 in a closed configuration. FIG. 7B depicts a perspective view of the rod end 700 in an open configuration. FIG. 7C depicts another perspective view of the rod end 700 in a closed position. FIG. 8A depicts a perspective sectional view of the rod end 700 in the closed configuration. FIG. 8B depicts a perspective sectional view of the rod end 700 in the open configuration.

The rod end 700 may be positioned on an end of a rod assembly 12 of the walking stick 100. The rod end 700 may be configured to selectively enable entry of water from a source into the rod assembly 12. The rod end 700 may include and outer sleeve 61 that may be rotated relative to an inner sleeve 60 (FIGS. 8A and 8B). The inner sleeve 60 and the outer sleeve 61 may have defined therein one or more openings 8. Rotation of the outer sleeve 61 relative to the inner sleeve 60 may align the openings 8 to arrange the rod end 700 in the open configuration or in the closed configuration.

In the open configuration, the openings 8 of the inner sleeve 60 may be aligned with the openings 8 of the outer sleeve 61. Accordingly, a volume defined in the rod assembly may be fluidly coupled to an external environment surrounding the walking stick 100. In the open configuration, water may enter the volume defined by the rod assembly 12 and may be sucked up into the pump mechanism.

In the closed configuration, the openings 8 of the inner sleeve 60 are not aligned with the openings 8 of the outer sleeve 61. Accordingly, the volume defined in the rod assembly 12 is isolated from the external environment surrounding the walking stick 100. In the closed configuration, water may not enter into the volume defined by the rod assembly 12, which may enable the volume to remain dry and clean.

The walking stick 100 may be arranged in the open configuration when the pump mechanism is in use or is being prepared for use. The walking stick 100 may be arranged in the closed configuration when the walking stick 100 is used for hiking, trekking, etc.

Figure 9A:
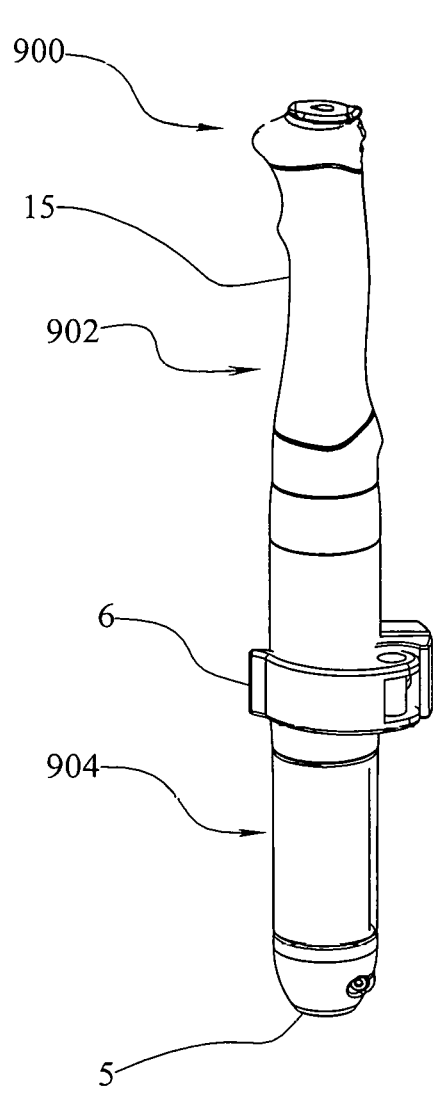
FIGS. 9A and 9B illustrate external views of an example handle assembly that may be implemented in the walking stick of FIG. 1.
Figure 9B:
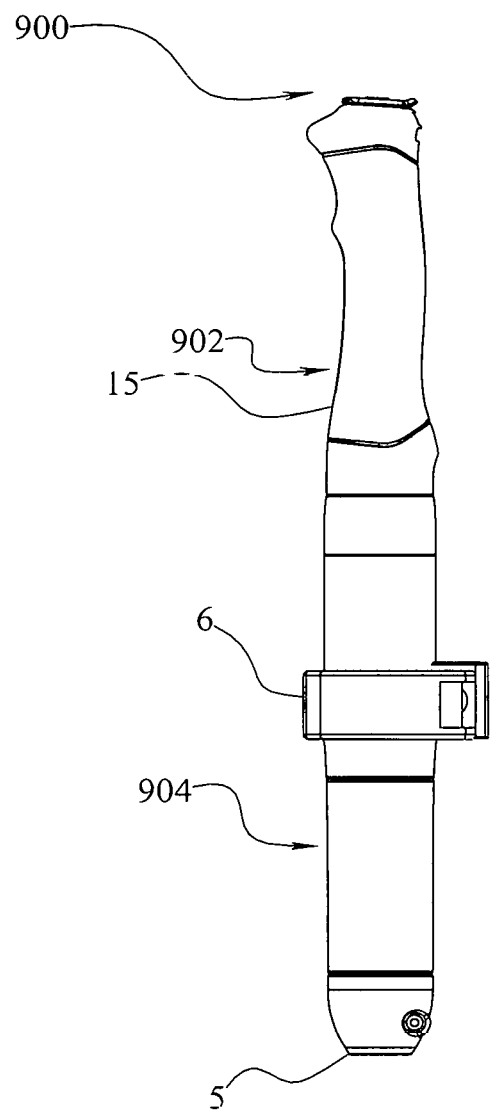

FIGS. 9A and 9B illustrate external views of an example handle assembly 900 that may be implemented in the walking stick 100 of FIGS. 1-1A. FIG. 9A is an image of the handle assembly 900. FIG. 9B is a diagram of a handle assembly 900.

In the depicted handle assembly 900, an upper handle 902 is included at a translating portion 15 of the walking stick 100. In addition, a lower handle 904 is included at a rod assembly 12 of the walking stick 100. The rod assembly 12 may be selectively coupled to the translating portion 15 by a collar 6. When the translating portion 15 is released from the rod assembly 12, the pump mechanism described elsewhere in the present disclosure may be utilized. For example, a user may grip the upper handle 902 and the lower handle 904 and translate the translating portion 15 relative to the rod assembly 12. Such translation pulls water from a source and pushes it through a filter in the walking stick 100.

Figure 10B:
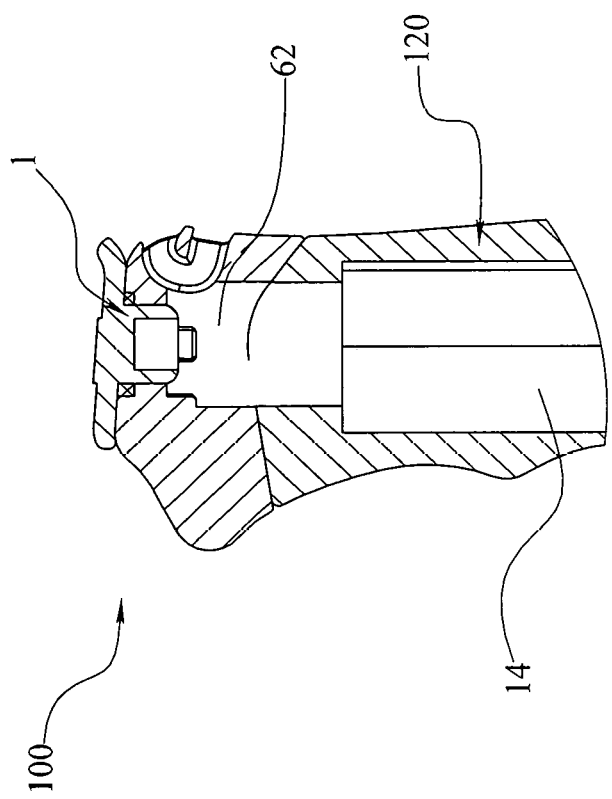
FIGS. 10A and 10B illustrate an example outlet that may be implemented in the walking stick of FIG. 1.
Figure 10A:
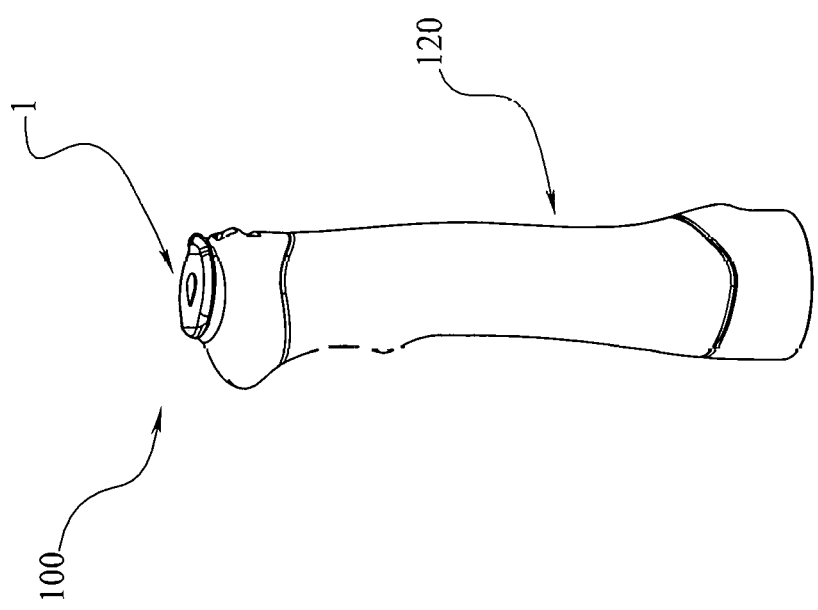

FIGS. 10A and 10B illustrate an example outlet that may be implemented in the walking stick 100 of FIGS. 1-1A. FIG. 10A illustrates an external view of an end of the walking stick 100. FIG. 10B illustrates a sectional view of the end of the walking stick 100. The end of the walking stick includes an outlet. The outlet may be fluidly connected to a filter chamber 14. As the water is pressed through the filter in the filter chamber 14, it may move to an upper conduit 62 and out of the outlet.

In some embodiments, the outlet may be configured to be fit with an accessory. The outlet may include threads, quick fittings, a nipple, etc. that may enable accessories to be selectively attached to the outlet. For instance, the outlet may be fit with a tube or a nipple that may be used to receive the filtered water and divert it to the user or to a bottle.

The end of the walking stick 100 may include a lever. The lever may be selectively positioned over the outlet. The lever may protect the outlet between uses.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A walking stick, comprising:
   a rod assembly that extends from a first end to a second end that is opposite the first end along a longitudinal direction of the rod assembly, wherein the rod assembly includes at least one rod section;
   a water purification assembly that is integrated with the rod assembly, and
   a pump mechanism that is configured to impose a pressure gradient in the water purification assembly, wherein
      the pump mechanism includes a plunger that is physically coupled to a handle portion,
      a motion of the plunger relative to the water purification assembly draws water into an inlet that is positioned in the rod section and through the water purification assembly, and
      the motion of the plunger results from translation of said handle portion in substantially the longitudinal direction of the rod assembly
   wherein the water purification assembly includes a filter entrance and a filter housing; and the filter housing defines a filter volume configured to receive a filter device that is configured to remove at least a portion of contaminants from the water through imposition of the pressure gradient in the inlet tube and the filter volume; and wherein a length of said walking stick is adjustable by translating an additional rod section into said at least one rod section wherein said plunger is sealed to said rod assembly with a check valve.

2. The walking stick as defined in claim 1 wherein at least one adjustment collar is situated between said at least one rod section and said additional rod section thereby securing said at least one rod section and said additional rod section relative to each other to either collapse or elongate said walking stick.

3. The walking stick as defined in claim 1 wherein a seal is located between each of said at least one rod sections and said additional rod section.

4. The walking stick as defined in claim 1 wherein a lower volume is selectively isolated by a check valve.

5. The walking stick as defined in claim 4 wherein an additional check valve is positioned between said lower volume and said water purification assembly.

6. The walking stick as defined in claim 1 wherein a rod end is positioned at said first end of said rod assembly wherein said rod end is configured to selectively enable entry of water into said rod assembly.

7. The walking stick as defined in claim 6 wherein said rod end has an outer sleeve with a plurality of openings that rotates relative to an inner sleeve with its own plurality of openings wherein when said plurality of openings on said outer sleeve are aligned with said plurality of openings on said inner sleeve, water is allowed entry into said rod assembly.

8. The walking stick as defined in claim 1 wherein said handle portion includes an upper handle and a lower handle wherein said upper handle constitutes a portion of a translating portion of said rod assembly and said lower handle is attached to said translating portion via a quick connect.

9. The walking stick as defined in claim 1 wherein an outlet for filtered water is connected to a second end of said walking stick and proximate a said water purification assembly.

10. The walking stick as defined in claim 9 wherein an accessory is attachable to said outlet.

11. The walking stick as defined in claim 9 wherein a lever is positioned above said outlet.

\* \* \* \* \*